United States Patent [19]
Pamer

[11] 3,906,865
[45] Sept. 23, 1975

[54] MATERIAL HANDLING APPARATUS
[75] Inventor: Karl A. Pamer, Chagrin Falls, Ohio
[73] Assignee: McNeil Corporation, Akron, Ohio
[22] Filed: Jan. 11, 1974
[21] Appl. No.: 432,688

Related U.S. Application Data
[63] Continuation-in-part of Ser. No. 261,377, June 9, 1972, Pat. No. 3,809,382, and Ser. No. 261,529, June 9, 1972, Pat. No. 3,827,366.

[52] U.S. Cl. .................... 104/89; 267/35; 267/152
[51] Int. Cl. .............................................. B61b 3/00
[58] Field of Search ................. 104/89, 91, 93, 95; 105/199 R; 267/152, 145, 141, 35

[56] References Cited
UNITED STATES PATENTS

| | | | |
|---|---|---|---|
| 2,781,001 | 2/1957 | Davino | 104/89 |
| 3,439,630 | 4/1969 | Cope | 105/199 R X |
| 3,557,707 | 1/1971 | Joy | 105/199 R X |
| 3,612,506 | 10/1971 | Malherbe | 267/152 |
| 3,692,325 | 9/1972 | Gouirand | 105/199 R X |
| 3,751,024 | 8/1973 | Pineau | 267/153 |
| 3,797,409 | 3/1974 | Frech | 104/89 X |
| 3,814,411 | 6/1974 | Aarons et al. | 267/152 X |
| 3,817,188 | 6/1974 | Lich | 105/199 R |
| 3,826,507 | 7/1974 | Brand et al. | 105/199 R X |

Primary Examiner—M. Henson Wood, Jr.
Assistant Examiner—Randolph A. Reese
Attorney, Agent, or Firm—Watts, Hoffmann, Fisher & Heinke Co.

[57] ABSTRACT

Overhead monorail material handling devices and having parts supported by resilient, flexible closed vessels or containers having liquid therein. In some applications a plurality of such vessels or containers are connected by conduit means so that the liquid therein can flow from one to another.

7 Claims, 7 Drawing Figures

MATERIAL HANDLING APPARATUS

CROSS REFERENCE TO RELATED APPLICATIONS

This application is a continuation-in-part of applications Ser. No. 261,377, now U.S. Pat. No. 3,809,382, and Ser. No. 261,529, now U.S. Pat. No. 3,827,366, filed June 9, 1972, the disclosures of which are incorporated herein by reference.

BACKGROUND OF THE INVENTION

1. Field of Invention

This invention relates to carrier type overhead material handling apparatus.

2. Description of the Prior Art

Material handling apparatus having a part thereof supported by springs, ball and socket devices and the like, are known but such devices are not entirely satisfactory for various reasons. Springs, for example, are typically not of the correct strength and/or resiliency for the applications in which they are used. Typical prior art devices are shown in U.S. Pat. Nos. 2,642,814 and 3,174,086.

SUMMARY OF THE INVENTION

The invention provides a novel and improved material handling apparatus, especially of the overhead, permanent installation type, such as, overhead monorail, suspended or underslung trolley systems, including overhead bridge cranes, etc., in which parts are supported by one or more resilient, flexible, closed containers or vessels having fluid therein or a gelatinous substance, preferably, a liquid, which provides limited universal relative frictionless movement between the parts in contact therewith. Where more than one vessel is employed some may be connected by conduit means to provide for the flow of fluid from one to the other.

The invention further provides novel and improved crane and other overhead material handling apparatus easy to install, reliable and quiet in operation, resistant to transmission of shock loads between different parts, in which loads are equalized between multiple supports, and incorporating numerous safety features not present in prior systems.

DESCRIPTION OF A PREFERRED EMBODIMENT

The invention is susceptible of embodiments in innumerable material handling applications, but has a special utility in overhead monorail material handling systems and is herein shown as embodied in such equipment or apparatus.

Figure 1:
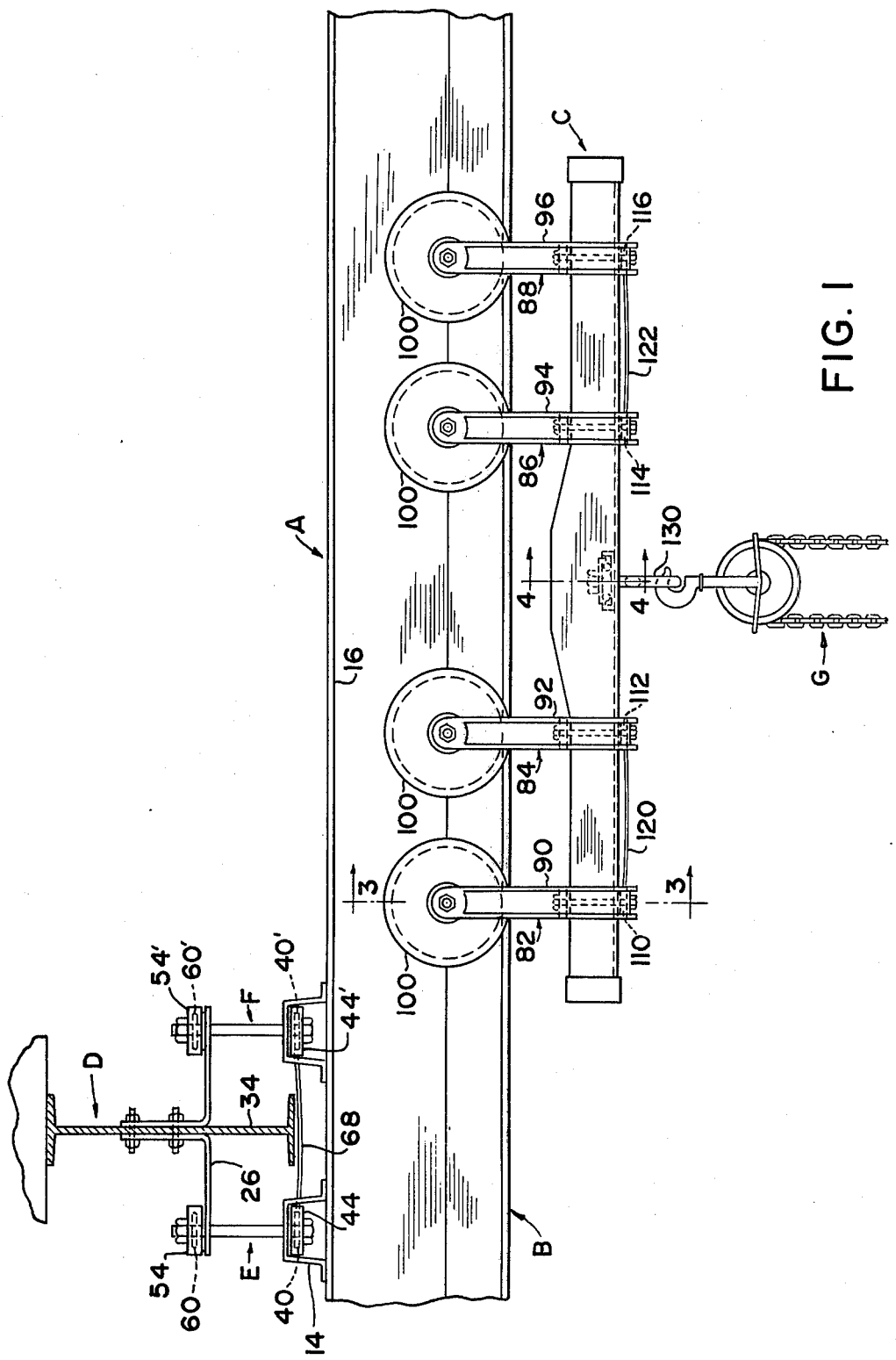
FIG. 1 is a fragmentary view of an overhead monorail material carrier system embodying the present invention.
Figure 2:
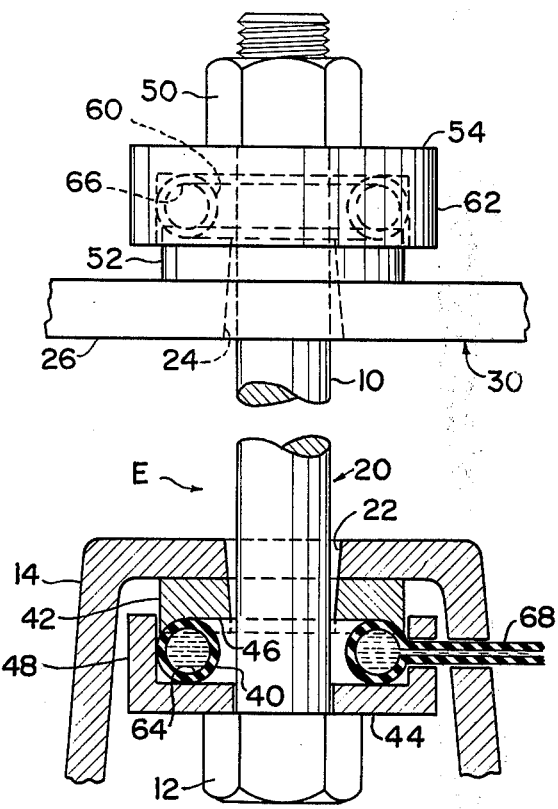
FIG. 2 is an enlarged view, with parts in section, of a portion of FIG. 1.
Figure 3:
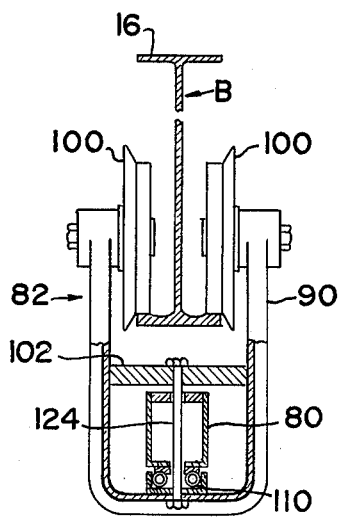
FIG. 3 is an enlarged sectional view, with parts in elevation, approximately on the line 3—3 of FIG. 1.
Figure 4:
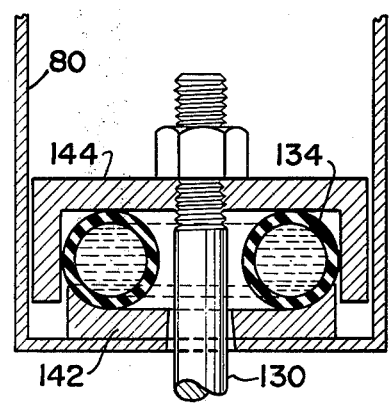
FIG. 4 is an enlarged sectional view, with parts in elevation, approximately on the line 4—4 of FIG. 1.

Referring to FIG. 1 of the drawings, the reference character A designates generally an overhead, monorail, material handling system comprising an I-shaped overhead beam-type monorail B along which a trolley C is movable. The trolley C, illustrated, is of the hand-propelled, carrier type. The term "trolley" as herein employed refers to any monorail equipment supported by and movable along the rail B such as hand and/or power-propelled carriers, tractors, crane trucks, etc. The rail B is suspended from an overhead support D such as an I-beam girder of a building by suspension supports E, F.

The rail supports E, F, illustrated, are duplicates of one another and only the support E is shown and described in detail. Where corresponding parts of the support F are identified and/or referred to, the same reference character is employed as for the support E, but having a prime mark applied thereto.

The support E comprises a hanger assembly including a hanger member in the form of a bolt 10 having its head 12 located within a channel-shaped bracket 14 suitably secured to the upper flange 16 of the I-shaped rail B and its shank 20 projecting upwardly through a suitable aperture 22 in the bracket 14 and through a similar aperture 24 in a horizontal flange 26 of an angle bracket 30, the vertical flange of which is secured, as by bolts to the web of the I-beam 34 of the overhead support D. The hanger assembly also includes a resilient, flexible ring-like closed container or vessel member 40 having fluid therein interposed between two spaced devices, for example, the members 42 and 44 positioned on the shank 20 of the bolt 10 between the web of the bracket 14 and the bearing surface of the head 12 of the bolt. The member 42 is a washer-like part having a recessed bottom side 46 and the member 44 is of cup-shaped configuration with a ring-like wall or flange 48 surrounding the outer periphery of the member 40 which limits deformation of the member 40 under loads imposed thereon. The washer member 42 has a maximum diameter slightly less than the inside diameter of the flange 48 of the member 44.

The members 42, 44 located at opposite ends of the resilient flexible fluid containing member 40 are so constructed that they substantially enclose the member 40. The upwardly projecting skirt or annular flange 48 extending adjacent to or, if desired, slightly above the lower surface of the member 42. The flange 48 provides an abutment surface surrounding the member 40. The interior diameter of the flange 48 is slightly larger than the maximum diameter of the member 42 and adequate area is provided between the members 42, 44 for the necessary expansion of the member 40. The enclosing or partially enclosing of the member 40 permits the member to be made smaller and/or constructed with side walls of less tensile strength and greater resiliency and flexibility for any given design load than would otherwise be the case.

The upper threaded end of the shank of the bolt 10 is provided with a nut 50 threaded thereon and between the bearing face thereof and the upper surface of the horizontal flange 26 of the bracket 30 are members 52,54, similar in construction to the members 42,44, respectively. A resilient, flexible vessel or member 60, similar to the member 40 is located between the recessed facing sides of the member 52 and the bottom of the cavity in the member 54 formed by the flange 62. The I-beam 34, bracket 30 and member 52 form the overhead support or assembly for the supported rail member or assembly including the rail B, bracket 14, and member 42. The apertures in the bracket 14, bracket flange 26 and members 42 and 52 are larger than the shank 20 of the bolt 10 extending therethrough as are the apertures in the resilient members 40,60. The resilient, flexible members 40,60 are hollow, that is, they have ring-like closed chambers 64,66 in the interior thereof. These chambers have fluid therein preferably liquid.

The construction is such that the load or weight of the rail B and any trolleys C traveling therealong is transferred to the overhead support D through the members 40,60. The members 40,60 are flexible and resilient, and with the clearance between the members 42,44 and the members 52,54 and between the shank 20 of the bolt 10 and the apertures in the bracket 14 and member 42 and the apertures in the flange 26 of the bracket 30 and member 52 provide limited universal movement of the members 44,54 relative to the members 42,52, respectively, thus permitting the bolt 10 to self-center and transmit the load vertically and uniformly and reduce any tendency to bend the shank of the bolt. The members 44,54 in effect float on the fluid in the chambers 64,66 of the vessel members 40,60. The members 40,60 also reduce shock loading of the bolt 10, bracket 30 and building structure due to travel of carriers along the rail B because they reduce the transmission of vibrations and sound between the rail and the overhead supporting structure, thus extending the fatigue life of the bolt, etc. The members 40,60 also eliminate lateral and longitudinal shock loadings of the buliding structure.

In applications where a plurality of closely spaced supports are employed, the closed fluid containing vessel or container members, preferably have two or more of their respective interior chambers connected by a conduit so that they are in communication with one another and the fluid therein can flow from one to another. In the embodiment illustrated the interior chambers of the members 40,40' are connected by a conduit 68 extending through suitable slots in the flanges of the members 44,44' so that fluid can flow back and forth from one of the interior chambers of the members 40,40' to the other. Alternatively the interior chambers of the members 60 and 60', 40' and 60, or 40 and 60' may be connected by a conduit extending through a suitable opening in the overhead support D. The connection 68 equalizes between the two bolts 10, 10' the load or weight of the rail, etc. carried thereby. This also reduces the shock loading of the bolts due to rail deflection incident to the movement of a trolley therealong, results in low impact transfer of the load to one bolt or support in the event one support fails, and provides a rail leveling function as the rail is subjected to changing load conditions, etc.

The carrier-type trolley C comprises a load bar 80 carried by a plurality of trucks 82, 84, 86, 88 having clevis-like or U-shaped frame members 90, 92, 94, 96, respectively. The distal end of the flange parts of the truck frame members are provided with wheels 100 which engage and travel along parts of the lower flange of the I-shaped rail B as opposite sides of the web of the rail. Each U-shaped truck frame member has a reinforcing member 102 connected to the flange parts of the frame thereof approximately midway between their ends. The load bar 80 extends through the frame members of the tracks between the flange posts thereof and is supported on the web parts of the truck frame members by resilient, flexible, ring-like members 110, 112, 114, 116 similar to the members 40,60 previously described.

The load bar shown is box-shaped in cross section and a single resilient member is interposed between the underside of the load bar and the horizontal web part of the frame of the truck therebelow. In the trolley illustrated the four trucks are arranged in pairs adjacent to opposite ends of the load bar and the interior chambers of the members 110, 112, and 114, 116 at opposite ends of the trolley are connected to one another by conduit means 120, 122, respectively. Members similar to the members 42,44 previously referred to, are employed at opposite ends of the members 110, 112, 114, 116 between the lower side of the load bar 80 and the upper side of the truck frame. Each of the trucks has a bolt 124 projecting through the web of the frame of the truck and the member 102 thereabove. The bolt 124 extends through the load bar 80, the resilient member 110 and the washer-like member between the load bar and the member 110 with sufficient clearance to allow limited universal movement of the load bar relative to its supporting trucks. The construction is simple, inexpensive and reliable and distributes the load equally between the trucks at opposite ends of the trolley.

The trolley C has a load grab or support G attached to the load bar 80 midway between its ends by an I-bolt 130 which is connected to the load bar in a manner like that in which the bolt 10 is connected to the bracket 14, by members 142, 144, 138 similar to the members 40, 42, 44, respectively, so as to reduce and/or eliminate the transmission of vibrations, shock load, etc., between the load grab and the load bar.

Figure 5:
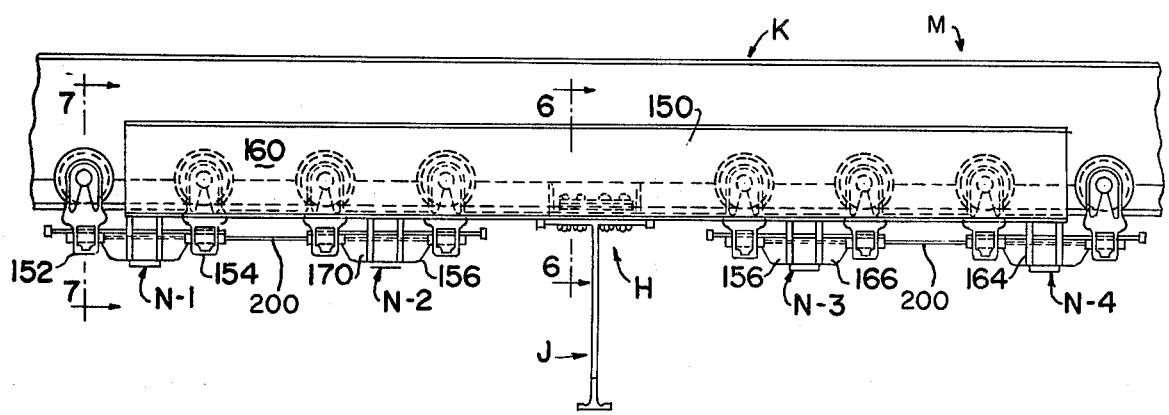
FIG. 5 is an elevational view of one end of a carrier transfer bridge or crane.
Figure 6:
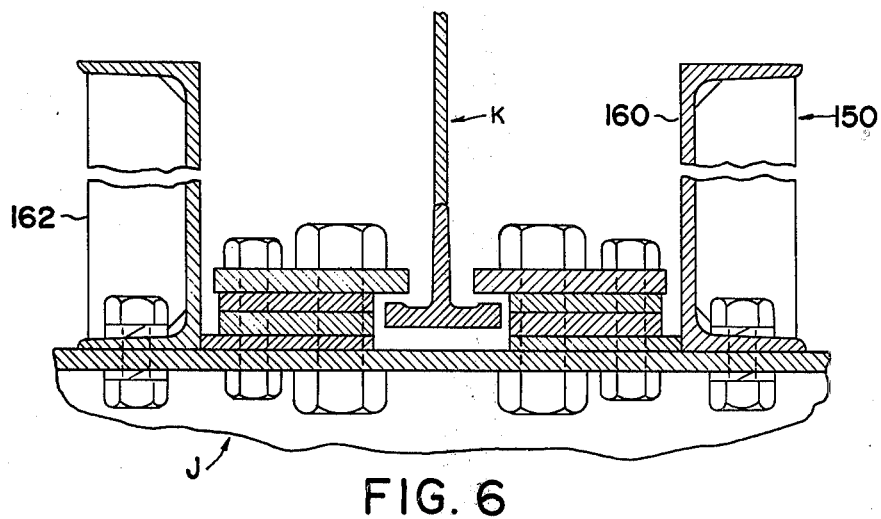
FIG. 6 is an enlarged fragmentary sectional view approximately on the line 6—6 of FIG. 5.
Figure 7:
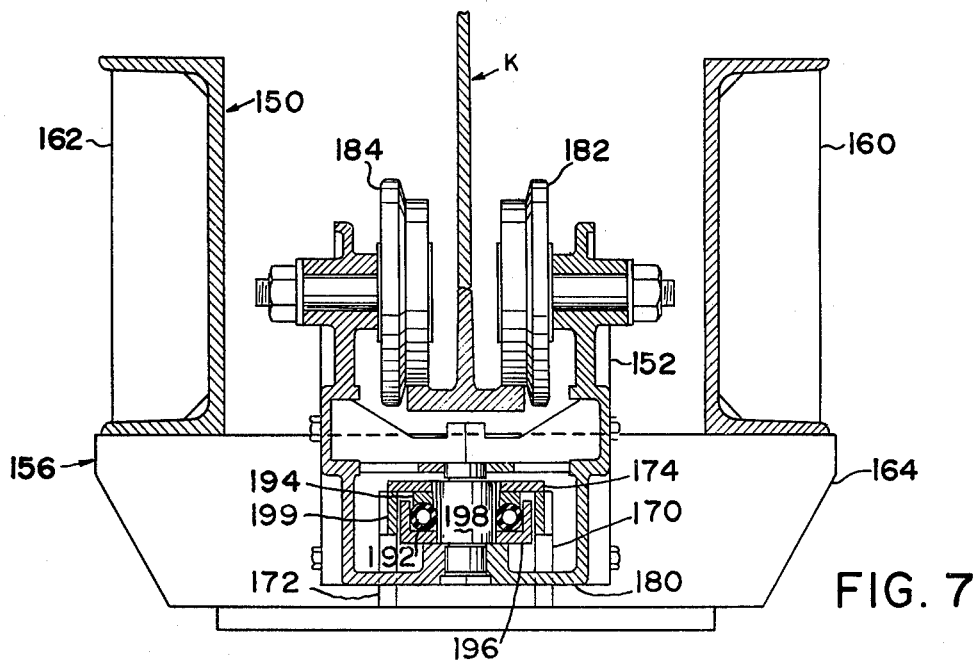
FIG. 7 is an enlarged sectional view approximately on the line 7—7 of FIG. 5.

As previously mentioned, the invention may be embodied in an overhead crane, for example, the monorail crane or carrier transfer bridge shown in FIGS. 5 to 7 designated generally by the reference character H and comprising a rail J similar to the beam-type rail B shown in FIG. 1. The rail J is carried by spaced end truck assemblies K to which the rail is connected adjacent to its opposite ends. Only one of the end truck assemblies K is shown in the drawings. Both assemblies, however, are duplicates of one another. The end trucks are supported and movable along a crane runway comprising spaced rails M similar to the beam-type rails previously referred to and supported from an overhead structure in a suitable manner, for example, by overhead supports similar to those employed in supporting the rail B of FIG. 1.

The end truck or truck assembly K shown comprises a built-up end truck frame 150 suspended below the rail M by four duplicate carriers N-1, N-2, N-3, N-4 each comprising two two-wheeled carrier trucks 152, 154 supporting a carrier which in turn support load bar assembly 156 of the crane end truck frame 150. The frame 150 comprises two spaced channel members 160,162 and the rail J is connected to the frame 150 of the end truck K by having its upper flanges bolted to the under sides of the channel members 160,162.

The channel members 160,162 of the crane truck frame rest upon and are welded to the upper edges of vertically orientated plate-like cross members 164, 166 of the load bar assemblies 156. Each of the load bar assemblies includes spaced, vertically orientated longitudinally extending side plate-like members 170,172 and a horizontal top plate 174 spaced below the channel members 160,162 and connected as by welding to the cross members 164,166 and the side members 170,172. The top plate 174 extends lengthwise of the carrier beyond the ends of the side members. The wheeled trucks 152,154 are alike and each comprise a two-part frame member 180 of generally U-shape configuration having rail engaging wheels 182,184 rotatably connected thereto adjacent the upper ends of its upwardly extending side flanges. The wheels 182,184 engage the upper sides of the lower flanges of the crane runway rail M and travel therealong as the crane H moves lengthwise along the runway.

Opposite ends of the top plate 174 of the load bar assembly 150 extend through the U-shaped frames 180 of the trucks 152,154 supporting the opposite ends of the load bar and are supported on the lower web parts of the frame members therebeneath by resilient flexible members having fluid therein similar to the members 40 previously described. Members 194,196 similar to the members 42,44 are interposed between opposite ends of the members 192 and the adjacent end of the top plate 174 of the load bar assembly 156 and the web of the truck frame 180 therebelow. The parts are maintained assembled by a cylindrical pin 198 fixed in the web of the frame member 180 and extending upwardly through the members 192, 194, 196 and the plate 174 with sufficient clearance to allow limited universal movement between the frame 180 and the load bar assembly 156. A cylindrical tubular member or sleeve 199 welded to the members 170, 172, 174 assists in maintaining the parts properly assembled.

From the foregoing disclosure it will be apparent that the crane end truck frame 150 and the four carrier load bar assemblies are a single weldment each of the opposite ends of which are supported for movement along the crane runway rail M by four carrier trucks through resilient, vessel members 192 having liquid therein. The members 192 at each side of the crane rail J are preferably connected to one another by conduit means 200, in a manner similar to that in which the members 40,40' are connected, so as to distribute the load of the crane end truck etc., evenly between the carrier truck at the respective ends of the crane end truck.

In addition to previously mentioned functions served by the use of the resilient flexible vessels having fluid therein, in applications such as that of supporting the rails B and J they provide for limited expansion and contraction of the rails as by changes in ambient temperatures without imposing flexing stresses on the hanger members and carrier trucks.

The liquid filled vessel members need not necessarily be ring-like in configuration but may be of any suitable shape, for example, cubical, and if ring-like they need not be circular. The preferred configuration, however, is one which provides end surfaces for engagement by the oppositely facing abutment surfaces of the members between which they are employed. The extent to which the liquid filled vessel members are compressed by any given load will be a function of their size, wall thickness, and the tensile strength and elasticity of the material of which they are made, etc. Obviously the liquid filled vessel or container members must be of a construction such that the load to which they are subject will not compress them sufficient to allow facing surfaces of the assemblies adjacent thereto or members engaging opposite ends thereof to contact one another. Where the liquid filled closed container members are of ring-like configuration their transverse cross-sectional configuration may be of any suitable shape. Because of the flexibility and resiliency of the closed vessel or container member and the liquid therein, the force or thrust transmitted thereby from one member engaged therewith to another at the opposite end will be uniformly distributed throughout the members.

As a further feature of the present invention, rupture of a liquid filled thrust member of the character herein disclosed can be quickly detected and identified by filling the members with liquid the color of which is such that it will be conspicuous onto parts adjacent thereto or drips onto equipment and/or objects therebelow.

From the foregoing description of preferred embodiments of the invention it will be apparent that the objects and advantages of the invention heretofore mentioned and others have been accomplished and that there has been provided a novel and improved overhead material handling apparatus which has many safety features, and otherwise, not incorporated in prior apparatuses.

While certain embodiments of the invention have been illustrated, described and referred to, as previously mentioned, the invention may be otherwise embodied, and while a single closed vessel or container member filled with liquid has been employed between the spaced abutment surfaces of the different support and supported members shown, it will be obvious that any number of such members may be employed, stacked one upon another, connected by conduit means as desired.

What is claimed is:

1. A trolley for a material handling system comprising: a load supporting member carried by a plurality of wheeled trucks each comprising a U-shaped frame member with wheels connected to the distal ends of the flange parts thereof and at least a part of said load supporting member extending between said flange parts and supported on the web parts of said frame members; a resilient, flexible closed vessel having fluid therein between said load supporting member and each of said web parts of said frame members subject to the entire weight of said load member and providing limited universal movement between said load and frame members; and a member connected to one of said load or frame members forming an abutment surface surrounding said resilient member limiting its expansion.

2. A trolley for an overhead material handling system comprising: a load supporting member carried by a plurality of wheeled trucks adapted to travel along an overhead track and each comprising a U-shaped frame member with track wheels connected to the distal ends of the flange parts thereof and at least a part of said load supporting member extending between said web parts and supported on the web parts of said frame members; a resilient, flexible closed vessel between said load member and said web part of each of said frame members; members connected to one of said load or frame members providing abutment surfaces surrounding each of said vessels limiting their expansion; conduit means connecting a plutality of said vessels; and said vessels and said conduit means having fluid therein.

3. A trolley for an overhead material handling system comprising: a U-shaped frame member having wheels adapted to travel along an overhead track connected to the distal ends of the flange parts thereof; a load supporting member extending through the opening between said flange parts and supported on the web part of said frame member; and a resilient, flexible closed vessel having liquid therein between said load member and said web part of said frame member subject to the entire weight of said load member; and members connected to one of said load or frame members providing abutment surfaces surrounding each of said vessels limiting their expension.

4. A trolley for an overhead material handling system comprising: a load supporting member carried by a plurality of wheeled trucks adapted to travel along an overhead track and each comprising a U-shaped frame member with track wheels connected to the distal ends of the flange parts thereof and at least a part of said load supporting member extending between said web parts and supported on the web parts of said frame members; a resilient, flexible closed vessel between said load supporting member and said web parts of each of said frame members; members connected to one of said load or frame members providing abutment surfaces surrounding each of said vessels limiting their expansion; conduit means connecting a plurality of said vessels; and liquid within said chambers and said conduit means.

5. A trolley for an overhead material handling system comprising: a load supporting member having a load support intermediate its ends, a plurality of wheeled trucks at one side of said load support, a plurality of wheeled trucks at the other side of said load support, each of said wheeled trucks having a U-shaped frame member with wheels adapted to travel along an overhead track connected to the distal ends of the flange parts thereof and at least a part of the load member extending through the opening between said flange parts and supported on the web part of said frame member; a resilient, flexible closed vessel between said load member and said web part of each of said frame members; members connected to one of said load or frame members providing abutment surfaces surrounding each of said vessels limiting their expansion; first conduit means connecting a plurality of said vessels at said one side of said load support, second conduit means connecting a plurality of said vessels at said other side of said load support; and said vessels and said conduit means having fluid therein.

6. In an overhead bridge crane: a beam; an end truck comprising a frame assembly and a plurality of two wheeled trucks adapted to travel along an overhead crane runway rail connected to each end of said beam, each of said two wheeled trucks comprising a U-shaped frame member with wheels adapted to travel along an overhead track connected to the distal ends of the flange parts thereof and at least a part of said frame assembly extending between said web parts and supported on the web parts of said frame members; resilient, flexible closed vessel having liquid therein between said frame assembly and each of said web parts of said frame members; and a member connected to one of said frame assembly or frame members forming an abutment surface surrounding said resilient members limiting their expansion.

7. In an overhead bridge crane: a beam, an end truck connected to said beam adjacent to its opposite ends; each of said end trucks comprising a frame assembly and a plurality of two wheeled trucks at opposite sides of said beam adapted to travel along an overhead crane runway rail and each comprising a frame member; a resilient, flexible closed vessel between said frame assembly and each of said frame members; members connected to one of said frame assembly or frame members providing abutment surfaces surrounding each of said vessels; discrete conduit means connecting a plurality of said vessels at each side of said beam; and liquid within said vessels and said conduit means.

* * * * *